3,407,219
17α-ALKYL-17β-METHYL-8ξ,9ξ,13ξ,14ξ-GONA-
1,3,5(10)-TRIEN-3-OLS AND CONGENERS
Leland J. Chinn, Morton Grove, Ill., assignor to G. D.
Searle & Co., Chicago, Ill., a corporation of Delaware
No Drawing. Filed Dec. 22, 1965, Ser. No. 515,734
8 Claims. (Cl. 260—397.5)

This invention relates to 17α-alkyl-17β-methyl-8ξ,9ξ,
13ξ,14ξ-gona-1,3,5(10)-trien-3-ols and congeners, and to processes for the preparation thereof. More particularly, this invention provides new, useful, and unobvious steroids of the formulas

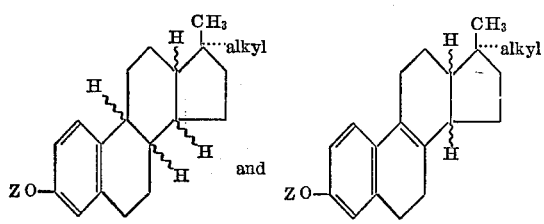

wherein Z represents hydrogen or an alkyl or aralkyl radical. Among the alkyl radicals called for, especially lower alkyl radicals are preferred, which is to say methyl, ethyl, propyl, isopropyl, butyl, isobutyl, sec-butyl, tert-butyl, pentyl, neopentyl, hexyl, isohexyl, heptyl, and like monovalent, saturated, acyclic straight-or branched-chain, hydrocarbon moieties of the formula $$-C_nH_{2n+1}$$

in which n represents a positive integer less than 8. The aralkyl radicals represented by Z are preferably benzyl, phenylethyl, and the like, in which the phenyl constituent can be substituted by one or more lower alkyl, halogen, and/or lower alkoxy radicals.

The compounds to which this invention relate are useful by reason of their valuable pharmacological properties. For instance, they reduce the fecundity of rodents, inhibit dicotyledonous seed germination, counteract inflammatory edema, depress the central nervous system, and are anti-gonadotropic.

Preparation of the subject compounds proceeds via the corresponding 17α-alkyl-17β-hydroxy-13-methyl-8β, 9α,13β,14α steroid. Thus, the appropriate phenolic ether

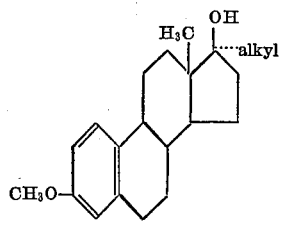

can be reduced with lithium in liquid ammonia to the corresponding dienolic ether

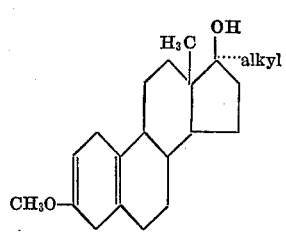

which, upon acidification with mineral acid, affords the 4-en-3-one

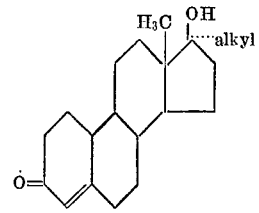

Either of the latter two compounds, upon heating with pyridine hydrochloride or hydrobromide, affords the 17α-alkyl-17β-methyl-8ξ,9ξ,13ξ,14ξ-gona-1,3,5(10)-trien-3 - ol.

The 3-ol, in turn, is converted to the 3-ether by contact with an appropriate alkyl or aralkyl halide or sulfate in the presence of strong base. The 17α-alkyl-17β-methyl-13ξ,14ξ-gona-1,3,5(10),8-tetraen-3-ols hereof are obtained directly from the aforesaid phenolic ether starting materials by heating them with pyridine hydrohalide, and can be etherified by the same procedures which apply to their 8,9-dihydro analogs.

The following examples described in detail compounds illustrative of the invention and methods which have been devised for their preparation. However, the invention is not to be construed as limited thereby, either in spirit or in scope, since it will be apparent to those skilled in the art of organic synthesis that many modifications, both of materials and of methods, may be practiced without departing from the purpose and intent of this disclosure. Throughout the examples hereinafter set forth, temperatures are given in degrees centigrade and relative amounts of materials in parts by weight, except as otherwise noted.

EXAMPLE 1

17α,17β-dimethyl-8ξ,9ξ,13ξ,14ξ-gona-1,3,5(10)-trien-3-ol

A mixture of 3 parts of 17β-hydroxy-17α-methylestr-4-en-3-one and 15 parts of pyridine hydrochloride is heated at 235±5° under nitrogen for 1½ hours, then cooled and diluted with 100 parts of water. The resultant mixture is chilled. Insoluble solids are filtered off, washed with water, dried in air, and recrystallized from a mixture of ether and hexane to give 17α,17β-dimethyl-8ξ,9ξ,13ξ,14ξ-gona-1,3,5(10)-trien-3-ol as colorless laths melting at 184.5–187°. The product has the formula

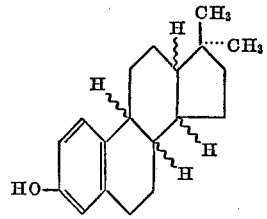

EXAMPLE 2

2-benzyloxy-17α,17β-dimethyl-8ξ,9ξ,13ξ,14ξ-gona-1,3,5(10)-triene

To a mixture of 11 parts of 17α,17β-dimethyl-8ξ,9ξ,13ξ, 14ξ-gona-1,3,5(10)-trien-3-ol and 160 parts of aqueous 95% ethyl alcohol is added, with agitation at room temperature, approximately 40 parts of a solution prepared by dissolving 80 parts of potassium hydroxide in 160 parts of aqueous 95% ethyl alcohol and 80 parts of water. To the resultant mixture is added, portionwise and alternately during 20 minutes, 132 parts of benzyl chloride and the balance of the aqueous alcoholic solution of potassium hydroxide. Approximately 8 parts of solid potassium hydroxide is thereupon introduced, and the mixture thus obtained is maintained at room temperatures with agitation for a further 1½ hours. At this point, 1000 parts of water is introduced; and the alcohol is then removed by distillation under nitrogen at around 90°. The residue is extracted with ether. The ether extract is washed with water and stripped of solvent by vacuum distillation. The residue is steam distilled until the distillate is clear, whereupon it is extracted with ether. The extract is washed with water, dried over anhydrous sodium sulfate, and stripped of solvent by vacuum distillation to afford a viscous oil as the residue. The oil crystallizes from hexane as colorless plates melting at 93–98.5°. The product thus obtained is 3-benzyloxy-17α,17β-dimethyl-8ξ,9ξ,13ξ,14ξ-gona-1,3,5(10)-triene having the formula

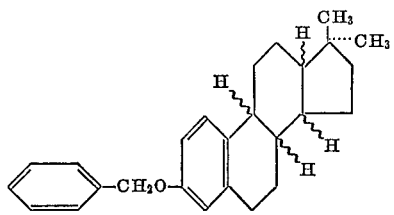

EXAMPLE 3

17α-ethyl-17β-methyl-8ξ,9ξ,13ξ,14ξ-gona-1,3,5(10)-trien-3-ol

A mixture of 100 parts of 17α-ethyl-17β-hydroxyestr-4-en-3-one and 485 parts of pyridine hydrochloride is heated at 240° under nitrogen for 1½ hours. The mixture is thereupon cooled and extracted with ether. The ether extract is washed with water, dried over anhydrous sodium sulfate, and stripped of solvent by vacuum distillation. The residue is taken up in hexane; and the resultant solution is chromatographed on silica gel, using hexane, benzene, and ethyl acetate as developing solvents. From an eluate comprising 50% benzene in hexane, on distillation of solvent and recrystallization of the residue from hexane, is obtained 17α-ethyl-17β-methyl-8ξ,9ξ,13ξ,14ξ-gona-1,3,5(10)-triene-3-ol as colorless plates melting at approximately 152–153.5°. The product has the formula

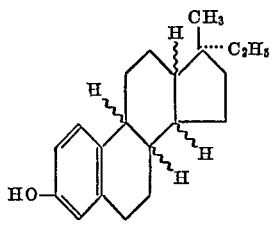

EXAMPLE 4

17α-ethyl-17β-methyl-8ξ,9ξ,13ξ,14ξ-gona-1,3,5(10)-trien-3-ol

A mixture of 22 parts of 17α-ethyl-3-methoxyestra-2,5(10)-dien-17β-ol and 100 parts of pyridine hydrochloride is heated at 230–235° under nitrogen for 1½ hours, then worked up as detailed in Example 3. The 17α-ethyl-17β-methyl-8ξ,9ξ,13ξ,14ξ-gona-1,3,5(10)-trien-3-ol thus isolated melts at approximately 153.5–154°.

EXAMPLE 5

17α-ethyl-3-methoxy-17β-methyl-8ξ,9ξ,13ξ,14ξ-gona-1,3,5(10)-triene

To a solution of approximately 21 parts of 17α-ethyl-17β-methyl-8ξ,9ξ,13ξ,14ξ-gona-1,3,5(10)-trien-3-ol in 400 parts of methyl alcohol is added, with agitation at room temperature, approximately 200 parts of a solution of potassium hydroxide prepared by dissolving 200 parts of 85% potassium hydroxide in 400 parts of methyl alcohol and 200 parts of water. There is then introduced, portionwise and alternately during 10 minutes with continued agitation, 390 parts of dimethyl sulfate and the balance of the aqueous alcoholic solution of potassium hydroxide. Next, 19 parts of solid potassium hydroxide is incorporated, and the resultant mixture is maintained with further agitation at room temperatures for ½ hour. The mixture is thereupon diluted with approximately 2 volumes of water, and the mixture thus obtained is extracted with ether. The ether extract is succesively washed with water and saturated brine, dried over anhydrous sodium sulfate, and stripped of solvent by vacuum distillation. The residual oil, upon trituration with methyl alcohol, affords 17α - ethyl - 3´ - methoxy-17β-methyl-8ξ,9ξ,13ξ,14ξ-gona-1,3,5(10)-triene as colorless crystals which, recrystallized from a mixture of ether and methyl alcohol, are obtained as colorless prisms melting at approximately 71–72°. The product has the formula

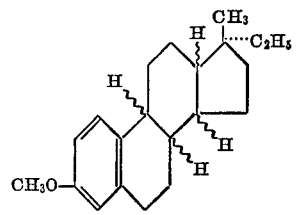

EXAMPLE 6

17α-17β-dimethyl-13ξ,14ξ-gona-1,3,5(10)-8-tetraen-3-ol

A mixture of 3 parts of 3-methoxy-17α-methylestra-1,3,5(10)-trien-17β-ol and 15 parts of pyridine hydrochloride is heated at 230±5° under nitrogen for 1 hour. The resultant mixture is cooled to room temperature, diluted with 100 parts of water, and then chilled. Insoluble solids are filtered off, washed with water, dried in air, and chromatographed on silica gel, using hexane, benzene, and ethyl acetate as developing solvents. From an eluate comprising 10% hexane in benzene, upon evaporation of solvent and recrystallization of the residue from a mixture of ether and hexane, 17α,17β-dimethyl-13ξ,14ξ-gona-1,3,5(10),8-tetraen-3-ol is obtained as colorless plates melting at 186–187.5°. The product has the formula

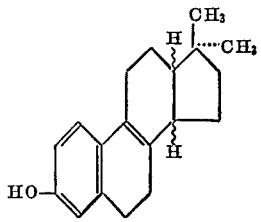

EXAMPLE 7

3-methoxy-17α,17β-dimethyl-13ξ,14ξ-gona-1,3,5(10),8-tetraene

To a mixture of 66 parts of 17α,17β-dimethyl-13ξ,14ξ-gona-1,3,5(10),8-tetraen-3-ol and 1200 parts of methyl alcohol is added, with agitation at room temperature, approximately 1000 parts of a solution of potassium hydroxide prepared by dissolving 1000 parts of potassium hydroxide in 2000 parts of methyl alcohol and 1000 parts of water. There is then introduced, portionwise and alternately with continued agitation, 1950 parts of dimethyl sulfate and the balance of the aqueous alcoholic potassium hydroxide solution. Finally, 100 parts of solid potassium hydroxide is mixed in, and agitation at room temperatures is continued thereafter for 1 hour. The resultant mixture is diluted with 10 volumes of water and chilled. The insoluble solids thrown down are filtered off, washed well with water, dried in air, and crystallized from a mixture of ether and methyl alcohol to give 3-methoxy-17α,17β-dimethyl - 13ξ,14ξ - gona-1,3,5(10),8- tetraene as colorless plates melting at approximately 120–121°. The product has the formula

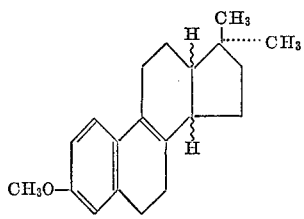

EXAMPLE 8

17α-ethyl-17β-methyl-13ξ,14ξ-gona-1,3,5(10),8-tetraen-3-ol

A mixture of 1 part of 17α-ethyl-3-methoxy-estra-1,3,5(10)-trien-17β-ol and 8 parts of pyridine hydrochloride is heated at 223±3° under nitrogen for 1 hour, then diluted with 200 parts of water. The mixture thus obtained is extracted with ether. The ether extract is washed with water and then with saturated brine, whereupon it is dried over anhydrous sodium sulfate, and stripped of solvent by vacuum distillation. The residue, a viscous oil, crystallizes from a mixture of ether and pentane to give 17α-ethyl-17β-methyl-13ξ,14ξ-gona-1,3,5(10),8-tetraen-3-ol as colorless plates melting at 168.5–170.5°. The product has the formula

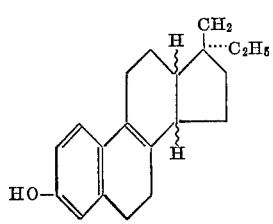

EXAMPLE 9

17α-ethyl-3-methoxy-17β-methyl-13ξ,14ξ-gona-1,3,5(10),8-tetraene

To a mixture of 27 parts of 17α-ethyl-17β-methyl-13ξ,14ξ-gona-1,3,5(10),8-tetraen-3-ol and 500 parts of potassium hydroxide in 1000 parts of water near the boiling point is added, portionwise with agitation, 1300 parts of dimethyl sulfate followed by a solution of 500 parts of potassium hydroxide in 1000 parts of water. The resultant mixture is allowed to stand at room temperatures for 1 hour, whereupon it is diluted with 10,000 parts of water and the mixture thus obtained chilled to 5°. The insoluble solids are filtered off, washed well with water, dried in air, and crystallized from pentane to give 17α-ethyl-3-methoxy-17β-methyl-13ξ,14ξ-gona - 1,3,5(10), 8-tetraene as colorless plates melting at 93.5–95°. The product has the formula

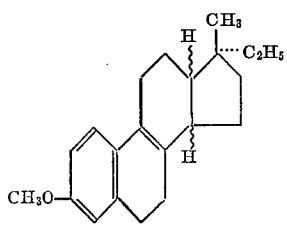

What is claimed is:
1. A compound selected from the group consisting of compounds of the formula

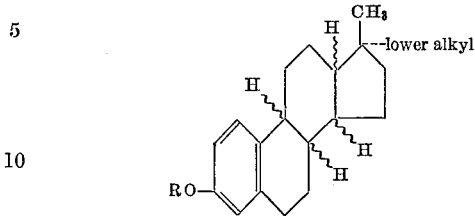

and Δ⁸ compounds otherwise identical, R in the formula being selected from the group consisting of hydrogen, benzyl, and lower alkyl, and the configuration of said compounds at all annular centers of asymmetry in the steroid ring system being identical with that which characterizes compounds prepared by heating a 17β-hydroxy-17α-(lower alkyl)estr-4-en-3-one with pyridine hydrochloride.

2. A compound according to claim 1 having the formula

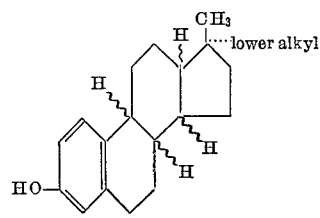

3. A compound according to claim 1 which is 17α,17β-dimethyl-8ξ,9ξ,13ξ,14ξ-gona-1,3,5(10),8-trien-3-ol.
4. A compound according to claim 1 which is 17α-ethyl-17β-methyl-8ξ,9ξ,13ξ,14ξ-gona-1,3,5(10)-trien-3-ol.
5. A compound according to claim 1 having the formula

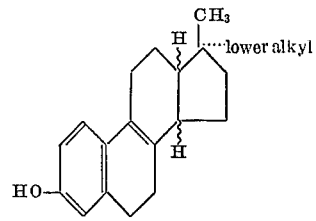

6. A compound according to claim 1 which is 17α,17β-dimethyl-13ξ,14ξ-gona-1,3,5(10),8-tetraen-3-ol.
7. A compound according to claim 1 having the formula

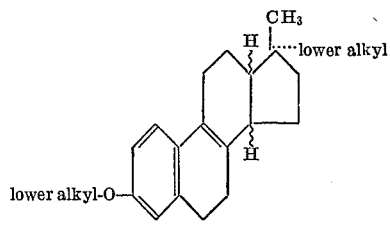

8. A compound according to claim 1 which is 3-methoxy-17α,17β-dimethyl-13ξ,14ξ-gona-1,3,5(10),8-tetraene.

No references cited.

HENRY FRENCH, *Primary Examiner.*